United States Patent
Chao et al.

(10) Patent No.: US 10,306,246 B2
(45) Date of Patent: May 28, 2019

(54) METHOD AND APPARATUS OF LOOP FILTERS FOR EFFICIENT HARDWARE IMPLEMENTATION

(71) Applicant: MediaTek Inc., Hsin-Chu (TW)

(72) Inventors: Ping Chao, Taipei (TW); Huei-Min Lin, Zhubei (TW); Chih-Ming Wang, Zhubei (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 401 days.

(21) Appl. No.: 15/010,062

(22) Filed: Jan. 29, 2016

(65) Prior Publication Data

US 2016/0241880 A1 Aug. 18, 2016

Related U.S. Application Data

(60) Provisional application No. 62/115,755, filed on Feb. 13, 2015.

(51) Int. Cl.
*H04N 19/42* (2014.01)
*H04N 19/82* (2014.01)
*H04N 19/86* (2014.01)

(52) U.S. Cl.
CPC .............. *H04N 19/42* (2014.11); *H04N 19/82* (2014.11); *H04N 19/86* (2014.11)

(58) Field of Classification Search
CPC .................................................... H04N 19/80
See application file for complete search history.

(56) References Cited

U.S. PATENT DOCUMENTS

2013/0083844 A1* 4/2013 Chong ................. H04N 19/463
375/240.02
2013/0322523 A1* 12/2013 Huang .................. H04N 19/46
375/240.02

FOREIGN PATENT DOCUMENTS

| CN | 103051892 A | 4/2013 |
| CN | 103503456 A | 1/2014 |
| WO | WO 2014/023207 | 2/2014 |

OTHER PUBLICATIONS

Applicant's admitted prior art and AVS2 standard.*

(Continued)

*Primary Examiner* — William C Vaughn, Jr.
*Assistant Examiner* — Jerry T Jean Baptiste
(74) *Attorney, Agent, or Firm* — McClure, Qualey & Rodack, LLP

(57) ABSTRACT

A method and apparatus for loop filter processing of reconstructed video data for a video coding system are disclosed. The system receives reconstructed video data for an image unit. The loop filter processing is applied to reconstructed pixels above a deblocking boundary of the current CTU. In order to reduce line buffer requirement and/or to reduce loop filter switching for image units, the sample adaptive offset (SAO) parameter boundary and spatial-loop-filter restricted boundary for the luma and chroma components are determined by global consideration. In one embodiment, the SAO parameter boundary and the spatial-loop-filter restricted boundary are aligned for the luma and chroma components respectively. In another embodiment, the SAO parameter boundary and the spatial-loop-filter restricted boundary for the luma and chroma components are all aligned.

25 Claims, 9 Drawing Sheets

(56) References Cited

OTHER PUBLICATIONS

Esenlik, S., et al.; "Grid displacements for in-loop filtering;" Joint Collaborative Team on Video Coding (JCT-VC) of ITU-T SG 16 WP3 and ISO/IEC JTC1/SC29/WG11; Jul. 2011; pp. 1-9.
Fu, C.M., et al.; "Sample Adaptive Offset in the HEVC Standard;" IEEE Transactions on Circuits and Systems for Video Technology; vol. 22; No. 12; Dec. 2012; pp. 1755-1764.
Chen, J., et al.; "Sample adaptive offset in AVS2 video standard;" IEEE; 2014; pp. 69-72.
Tsai, C.Y., et al.; "Adaptive Loop Filtering for Video Coding;" IEEE Journal of Selected Topics in Signal Processing; vol. 7; No. 6; Dec. 2013; pp. 934-945.
Gao, et al.; "Chapter 7—In-Loop Filter;" Advanced Video Coding Systems; Jun. 2016; pp. 115-134.
Esenlik, S., et al.; "Grid displacements for ALF;" Joint Collaborative Team on Video Coding (JCT-VC) of ITU-T SG 16 WP3 and ISO/IEC JTC1/SC29/WG11; May 2012; pp. 1-7.
Chen, C.Y., et al.; "Non-CE8.c,7 Single-source SAO and ALF virtual boundary processing with cross9x9;" Joint Collaborative Team on Video Coding (JCT-VC) of ITU-T SG 16 WP3 and ISO/IEC JTC1/SC29/WG11; Nov. 2011; pp. 1-25.
"9.11.2 (SAO unit derivation) and 9.12.3 (ALF unit derivation) of Information Technology—High Efficiency Media Coding—Part2: Coding;" Feb. 7, 2015 pp. 1-177.
Partial translation of "9.11.2 (SAO unit derivation) and 9.12.3 (ALF unit derivation) of Information Technology—High Efficiency Media Coding—Part2: Coding".

\* cited by examiner

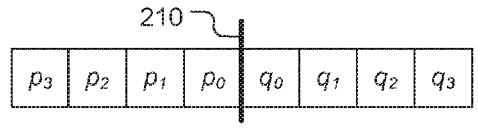
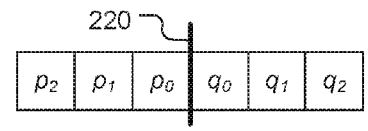
*Fig. 2A*  *Fig. 2B*
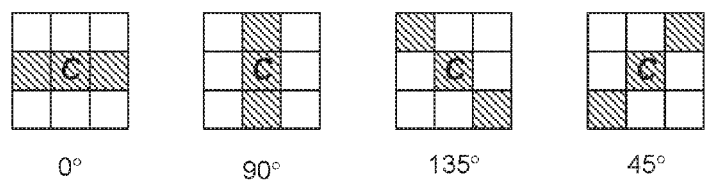
*Fig. 3*
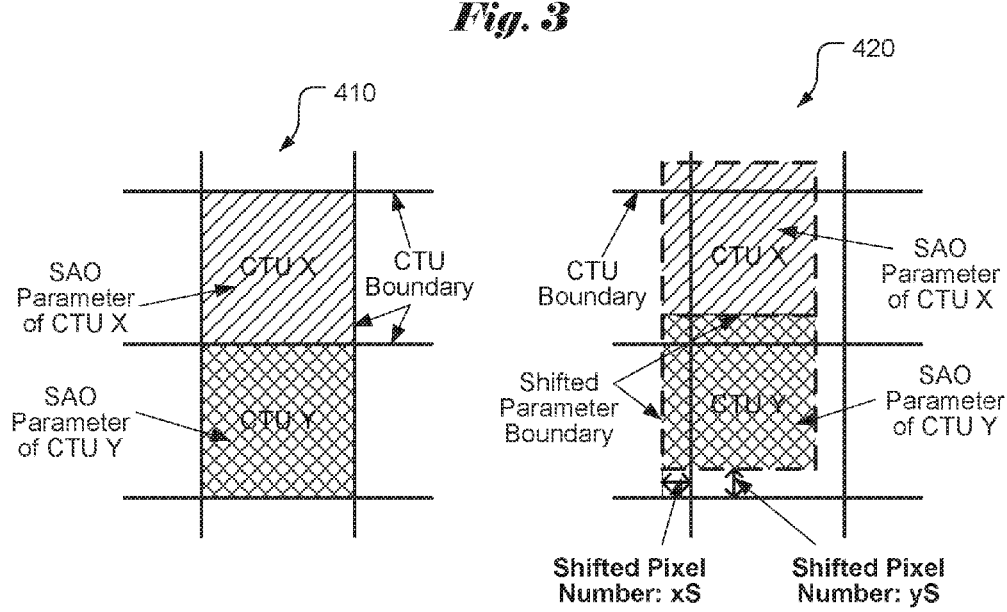
*Fig. 4*

METHOD AND APPARATUS OF LOOP FILTERS FOR EFFICIENT HARDWARE IMPLEMENTATION

CROSS REFERENCE TO RELATED APPLICATIONS

The present invention claims priority to U.S. Provisional Patent Application, Ser. No. 62/115,755, filed on Feb. 13, 2015. The U.S. Provisional Patent Application is hereby incorporated by reference in its entirety.

FIELD OF THE INVENTION

The present invention relates to video coding system. In particular, the present invention relates to method and apparatus of loop filters including a combination of Deblocking Filter (DF), Sample Adaptive Offset (SAO) and Adaptive Loop Filter (ALF) for improving visual quality of reconstructed video data in video coding systems.

BACKGROUND

Motion estimation is an effective Inter-frame coding technique to exploit temporal redundancy in video sequences. Motion-compensated Inter-frame coding has been widely used in various international video coding standards The motion estimation adopted in various coding standards is often a block-based technique, where motion information such as coding mode and motion vector is determined for each macroblock or similar block configuration. In addition, Intra-coding is also adaptively applied, where the picture is processed without reference to any other picture. The Inter-predicted or Intra-predicted residues are usually further processed by transformation, quantization, and entropy coding to generate a compressed video bitstream. During the encoding process, coding artifacts are introduced, particularly in the quantization process. In order to alleviate the coding artifacts, additional processing has been applied to reconstructed video to enhance picture quality in newer coding systems. The additional processing is often configured in an in-loop operation so that the encoder and decoder may derive the same reference pictures to achieve improved system performance.

FIG. 1A illustrates an exemplary adaptive Inter/Intra video coding system incorporating in-loop processing. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard being developed, Deblocking Filter (DF) 130, Sample Adaptive Offset (SAO) 131 and Adaptive Loop Filter (ALF) 132 have been developed to enhance picture quality. The in-loop filter information may have to be incorporated in the bitstream so that a decoder can properly recover the required information. Therefore, in-loop filter information from SAO and ALF is provided to Entropy Encoder 122 for incorporation into the bitstream. In FIG. 1A, DF 130 is applied to the reconstructed video first; SAO 131 is then applied to DF-processed video; and ALF 132 is applied to SAO-processed video. However, the processing order among DF, SAO and ALF can be re-arranged. The system in FIG. 1A may correspond to the High Efficiency Video Coding (HEVC) system (except for the ALF) or AVS2, which is a video coding standard developed by the Audio and Video Coding Standard Workgroup of China. The ALF process has been evaluated during HEVC development. However, ALF is not adopted in the current HEVC standard.

FIG. 1B illustrates a system block diagram of a corresponding video decoder including deblocking filter, sample adaptive offset and adaptive loop filter. Since the encoder also contains a local decoder for reconstructing the video data, some decoder components are already used in the encoder except for the entropy decoder 142. Furthermore, only motion compensation 144 is required for the decoder side. The switch 146 selects Intra-prediction or Inter-prediction and the selected prediction data are supplied to reconstruction (REC) 128 to be combined with recovered residues. Besides performing entropy decoding on compressed video data, entropy decoding 142 is also responsible for entropy decoding of side information and provides the side information to respective blocks. For example, Intra mode information is provided to Intra-prediction 110, Inter mode information is provided to motion compensation 144, adaptive offset information is provided to SAO 131, adaptive loop filter information is provided to ALF 132 and residues are provided to inverse quantization 124. The residues are processed by IQ 124, IT 126 and subsequent reconstruction process to reconstruct the video data. Again, reconstructed video data from REC 128 undergo a series of processing including IQ 124 and IT 126 as shown in FIG. 1B and are subject to intensity shift. The reconstructed video data are further processed by DF 130, SAO 131 and ALF 132.

The coding process in HEVC is applied according to Largest Coding Unit (LCU), also called Coding Tree Unit (CTU). The LCU is adaptively partitioned into coding units using quadtree. In HEVC, the DF is applies to 8×8 block boundaries. For each 8×8 block, horizontal filtering across vertical block boundaries is first applied, and then vertical filtering across horizontal block boundaries is applied. FIG. 2A illustrates an example of DF processing for the luma component in HEVC, where block boundary 210 with 4 boundary pixels on each side of the block boundary are involved. The boundary may correspond to a vertical boundary or a horizontal boundary. The boundary pixels are designated as q0, q1, q2 and q3, and p0, p1, p2 and p3, where q0 and p0 are two pixels immediately adjacent to the boundary. During processing of a luma block boundary, 4 pixels of each side are involved in filter parameter derivation, and up to 3 pixels on each side (i.e., p0, p1, p2 or q0, q1, q2) can be modified after filtering. For horizontal filtering across vertical block boundaries, unfiltered reconstructed pixels are used for filter parameter derivation and are used as source pixels for filtering. For vertical filtering across horizontal block boundaries, DF processed intermediate pixels (i.e. pixels after horizontal filtering) are used for filter parameter derivation and also used as source pixel for filtering. The DF processing for the chroma component in HEVC, 2 boundary pixels on each side of the block boundary are involved and only 1 pixel may be modified (i.e., p0 or q0).

FIG. 2B illustrates an example of DF processing for the luma component in AVS2, where block boundary 220 with 3 boundary pixels on each side of the block boundary are involved. The boundary pixels are designated as q0, q1 and q2, and p0, p1 and p2, where q0 and p0 are two pixels immediately adjacent to the boundary. For DF processing of a chroma block boundary, two pixels of each side are involved in filter parameter derivation. For AVS2, the DF processing may modify all involved boundary pixels. In other words, 3 luma pixels and 2 chroma pixels on each size of the block boundary may be modified.

Sample adaptive offset (SAO) types according to HEVC and AVS2 are shown in FIG. 3, where four SAO types are used corresponding to four orientations at 0°, 90°, 135°, and 45°. SAO is a per-pixel in-loop filtering. SAO parameters are updated for each LCU or CTU. For SAO orientation type, pixel classification is first done to classify pixels into different groups (also called categories or classes) as according to the classification conditions shown in Table 1. After classification, each reconstructed and DF processed pixel is compensated by an offset value based on the orientation type selected and the classification result.

TABLE 1

| Category | Condition |
| --- | --- |
| 1 | C < two neighbors |
| 2 | C < one neighbor && C == one neighbor |
| 3 | C > one neighbor && C == one neighbor |
| 4 | C > two neighbors |
| 0 | None of the above |

The conditions for the SAO classification as shown in Table 1 can be implemented by comparing the center pixel with two neighboring pixels individually. The conditions for classification checks whether the center pixel is greater than, smaller than or equal to one of the neighboring pixels. The three comparison results may be represented by a 2-bit data for each comparison result.

The SAO parameters such as pixel offset values and SAO types can be determined adaptively for each CTU. For HEVC, the SAO parameter boundary is the same as the CTU boundary. Within the parameter boundary, SAO process for all pixels share the same SAO types and offset values. Since SAO is applied to DF processed pixels, the SAO process for a current CTU has to wait for the DF process to complete for the current CTU. However, the pixels around the CTU boundary cannot be processed by DF until the reconstructed video data around the CTU boundary on the other side of the CTU boundary are ready. Due to such data dependency, AVS2 adopted shifted SAO parameter boundaries. FIG. 4 illustrates an example of SAO parameter boundary shift according to the AVS2 standard. The SAO parameter boundary example 410 corresponds to the HEVC case, where the SAO parameter boundary is aligned with the CTU boundary. The SAO parameter boundary 420 corresponds to the AVS2 case, where the SAO parameter boundary is shifted left and up with respect to the CTU boundary by xS and yS respectively. In particular, AVS2 uses xS=4 and yS=4.

Adaptive Loop Filtering (ALF) 132 is a video coding tool to enhance picture quality. ALF has been evaluated during the development stage of HEVC. However, ALF is not adopted in the current HEVC standard. Nevertheless, it is being incorporated into AVS2. In particular, a 17-tap symmetric ALF filter is being used for AVS2 as shown in FIG. 5. The 17-tap symmetric ALF filter implies that the filter operation for a current pixel may require data from 3 following lines. When these lines are from another CTU, particular the CTU in a following CTU row, the ALF process has to be delayed till the following related data are available. This implies the need for line buffer to temporarily store the related data in the current CTU for later processing. In order to overcome this data dependency issue, AVS2 adopts ALF virtual boundary to restrict ALF processing not to cross the virtual boundary. FIG. 6 illustrates an example of ALF virtual boundary for the luma component according to AVS2, where the ALF processing for selected pixels (i.e., a, b, c and d) are shown. Line 610 represents the CTU boundary between CTU X and CTU Y. Line 620 represents the luma ALF virtual boundary, which is located at 4 lines (i.e., yC-4) above the CTU boundary (i.e., yC) according to AVS2. For the chroma component, the ALF virtual boundary is located 3 lines (i.e., yC-3) above the CTU boundary according to AVS2 (*Information Technology—Advanced Media Coding Part 2: Video Final Committee Draft*, Audio and Video Coding Standard Workgroup of China, Feb. 7, 2015, Document: N2120.D3). For pixels a, b and c, the ALF process is applied during the CTU X processing stage. Furthermore, the ALF process for pixels a, b and c only uses information above the virtual boundary. For pixel d below the virtual boundary, the ALF process is applied during the CTU Y processing stage and only uses information below the virtual boundary. The use of virtual boundary to restrict data dependency can help to reduce the requirement on the line buffer capacity.

As mentioned above, the DF, SAO and ALF process involves neighboring data. In HEVC and AVS2, CTU has been used as a unit for coding process. When the DF, SAO and ALF processes are applied to data across a CTU boundary, the data dependency has to be managed carefully to minimize line buffer. Since the DF, SAO and ALF processes are applied to each CTU sequentially, the corresponding hardware implementation may be arranged in a pipeline fashion. FIG. 7 illustrates an example of data dependency associated with the DF, SAO and ALF processes for an AVS2 decoder. The CTU based processing order 700 is shown in FIG. 7 and the CTU boundary between CTU X and CTU Y is indicated by reference number 705. As shown in FIG. 7, the reconstructed video from reconstruction block 710 is processed by DF 720, SAO 730 and ALF 740. The output from ALF 740 is stored in a decoded frame buffer.

The processing status for corresponding DF 720, SAO 730 and ALF 740 processes are indicated by respective reference numbers 725, 735 and 745. Diagram 725 illustrates the DF processing status at the end of DF processing stage for CTU X. Luma pixels above line 722 and chroma pixels above line 724 are DF processed. Luma pixels blow line 722 and chroma pixels below line 732 cannot be processed during DF processing stage for CTU X since involved pixels on the other side of block boundary (i.e., below CTU boundary 705) are not available yet. Diagram 735 illustrates the SAO processing status at the end of SAO processing stage for CTU X. Luma pixels above line 732 and chroma pixels above line 734 are SAO processed, where line 732 and line 734 are aligned. Diagram 745 illustrates the ALF processing status at the end of ALF processing stage the CTU X. Again, the luma pixels below line 732 and the chroma pixels below line 734 cannot be processed by SAO for CTU X yet since it involves SAO parameter signaled in the CTU Y, which is not yet processed by VLD. Luma pixels above line 742 (luma ALF virtual boundary) are ALF processed. Chroma pixels above line 744 (chroma ALF virtual boundary) would be ALF processed according to the AVS2 draft standard. Nevertheless, the ALF process for the chroma component cannot be performed for chroma lines A through D during the CTU X processing stage. For example, the ALF process for pixel 746 will use pixel 748. Since chroma pixel 748 is below the chroma SAO parameter boundary 734, chroma pixel 748 is not SAO processed yet for the CTU X processing stage. Therefore, even though it is above the chroma ALF virtual boundary, chroma pixel 746 cannot be ALF processed. Accordingly, 6 lines of chroma SAO processed lines above pixel 748 (i.e., above line D) have to be stored in buffer for later ALF process on lines A through D during the CTU Y processing stage, wherein the three lines above line A have been ALF processed in the CTU X processing stage but also being required by the ALF process on line A.

For hardware based implementation, the 6 lines of chroma samples with picture width have to be stored in line buffer, which is usually implemented using embedded memory and such implementation would result in high chip cost. Therefore, it is desirable to develop a method and apparatus that can reduce the required line buffer associated with DF, SAO and ALF processes. Furthermore, for different SAO parameter boundaries, the system will switch between different SAO parameters. This will increase system complexity and power consumption. Therefore, it is desirable to develop DF, SAO and ALF processes with proper system parameter design to reduce line buffer requirement, system complexity, system power consumption, or any combination thereof. In yet another aspect, it is desirable to develop method and apparatus for performance and cost efficient loop filter processing including DF, SAO and ALF for any video coding system incorporating such loop filter processing.

BRIEF SUMMARY OF THE INVENTION

A method and apparatus for loop filter processing of reconstructed video data for a video coding system are disclosed. The system receives reconstructed video data for an image unit and applies loop filter processing to the reconstructed video data on an image unit by image unit basis. The loop filter processing is applied to reconstructed pixels above a deblocking boundary of the current image unit. Deblocking filter (DF) process is applied to reconstructed pixels. The DF processing modifies up to M luma pixels and N chroma pixels at each side of a horizontal edge corresponding to an image unit boundary between two image units. Sample adaptive offset (SAO) process is applied to DF-processed luma pixels and DF-processed chroma pixels according to SAO parameter. All or a part of pixels within SAO parameter boundary share the same SAO parameter. Luma SAO parameter boundary of current image unit is shifted-up by yS lines from a bottom boundary of current image unit and chroma SAO parameter boundary of current image unit is shifted-up by ySC lines from the bottom boundary of current image unit. Spatial-loop-filter process is applied to SAO-processed luma pixels above a luma spatial-loop-filter restricted boundary according to one or more luma spatial-loop-filter parameters. The luma spatial-loop-filter restricted boundary is shifted-up by yV lines from the bottom boundary of current image unit. The spatial-loop-filter process is applied to SAO-processed chroma pixels above a chroma spatial-loop-filter restricted boundary according to one or more chroma spatial-loop-filter parameters. The chroma spatial-loop-filter restricted boundary is shifted-up by yVC lines from the bottom boundary of current image unit. In order to reduce both the computational complexity of SAO parameter switching and the requirement of line buffer, yS, ySC, yV and yVC are determined according to M and N, yS and yV are greater than M, ySC and yVC are greater than N, yS is always equal to yV, and ySC is always equal to yVC.

Each image unit may correspond to a coding tree unit (CTU). The spatial-loop-filter process may correspond to adaptive loop filter (ALF) process.

In one embodiment, yS and yV are equal to (M+1) and ySC and yVC are equal to (N+1). In another embodiment, yS, yV, ySC and yVC are equal to (Max (M, N)+1). In yet another embodiment, yS and yV are equal to (M+m) and ySC and yVC are equal to (N+n), and m and n are integers greater than 1. In still yet another embodiment, yS, yV, ySC and yVC are equal to (Max (M, N)+m), and m is an integer greater than 1. For example, in the case of M=3 and N=2, yS and yV are equal to 4 and ySC and yVC are equal to 3 in one embodiment. In another embodiment, yS, yV, ySC and yVC are equal to 4. In yet another embodiment, yS and yV are equal to (3+m) and ySC and yVC are equal to (2+n), and m and n are integers greater than 1. In still yet another embodiment, yS, yV, ySC and yVC are equal to (3+m), and m is an integer greater than 1.

BRIEF DESCRIPTION OF THE DRAWINGS

FIG. 2A illustrates pixels on both sides of a block boundary involved with the Deblocking Filter process for the luma component according to HEVC.

FIG. 2B illustrates pixels on both sides of a block boundary involved with the Deblocking Filter process for the luma component according to AVS2.

FIG. 3 illustrates pixel classification based on a 3×3 window, with four orientation types corresponding to 0°, 90°, 135°, and 45°.

FIG. 4 illustrates an example of SAO parameter boundary shift according to the AVS2 standard.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
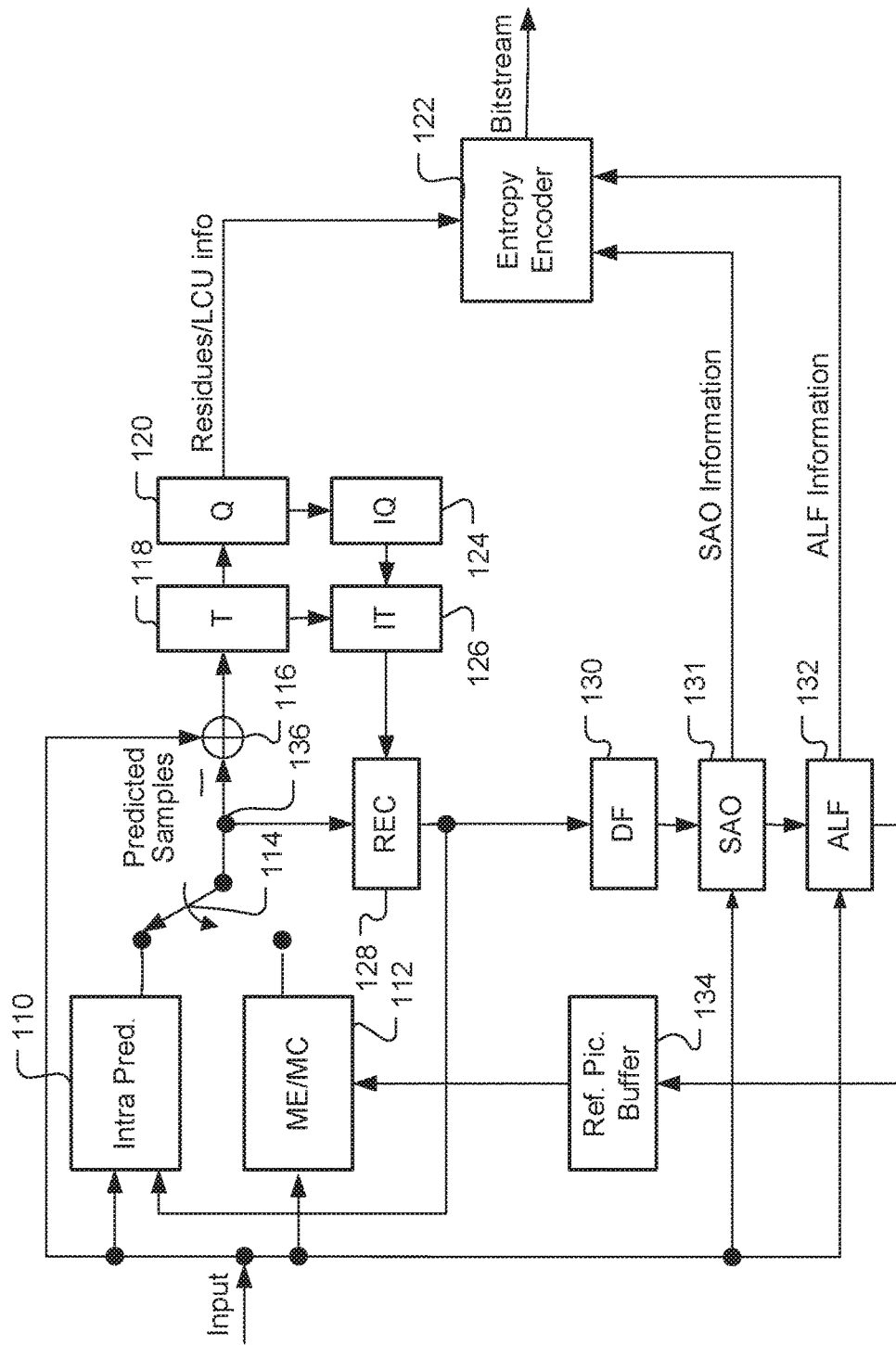
FIG. 1A illustrates an exemplary adaptive inter/intra video encoding system incorporating loop filters including Deblocking Filter (DF), Sample Adaptive Offset (SAO) and Adaptive Loop Filter (ALF) for reconstructed video data.
Figure 1B:
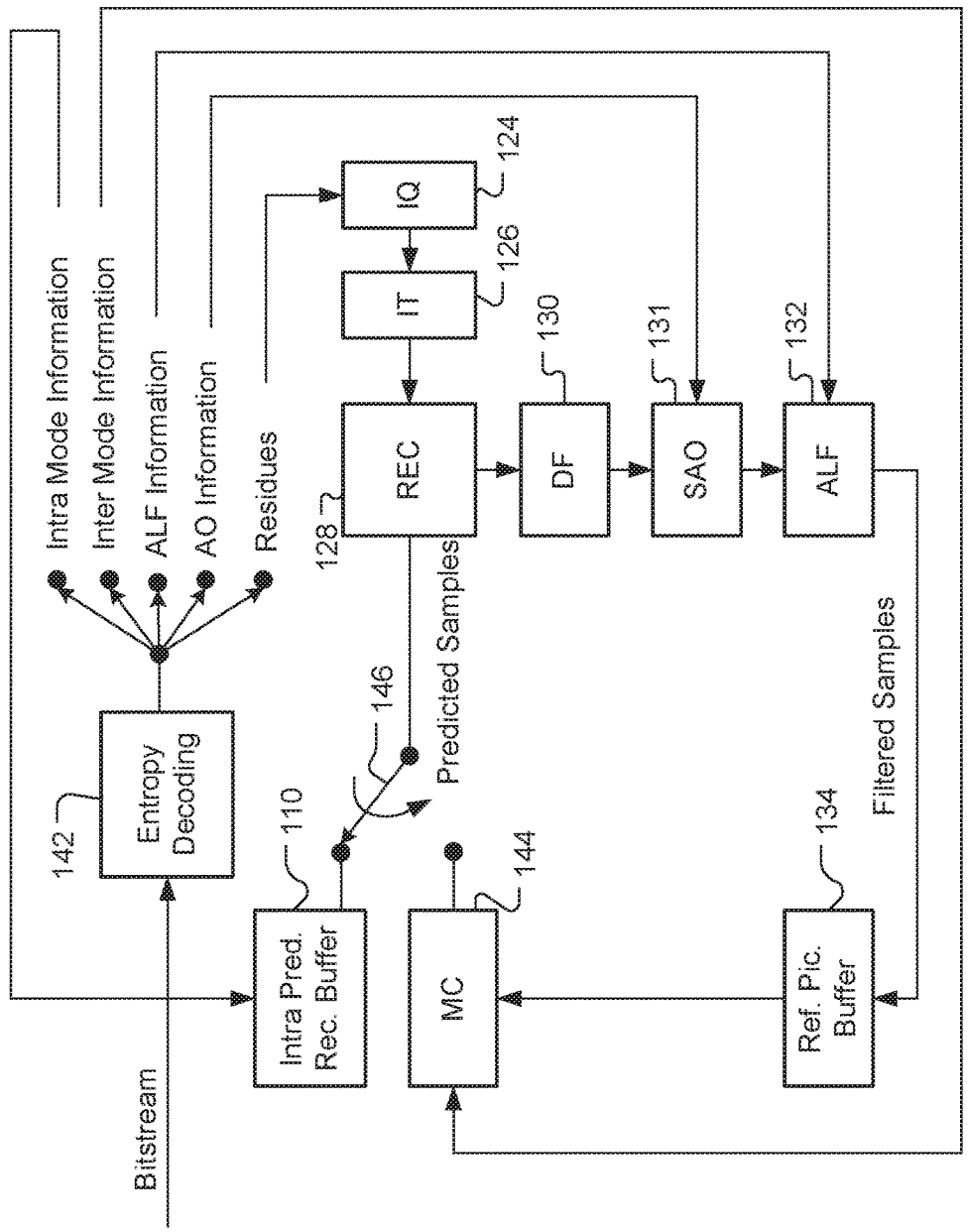
FIG. 1B illustrates a system block diagram of a corresponding video decoder including deblocking filter, sample adaptive offset and adaptive loop filter.
Figure 5:
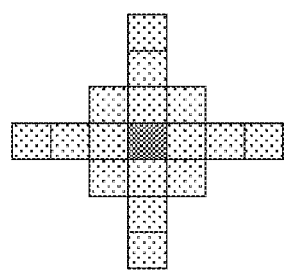
FIG. 5 illustrates the 17-tap symmetric ALF filter adopted by AVS2.
Figure 6:
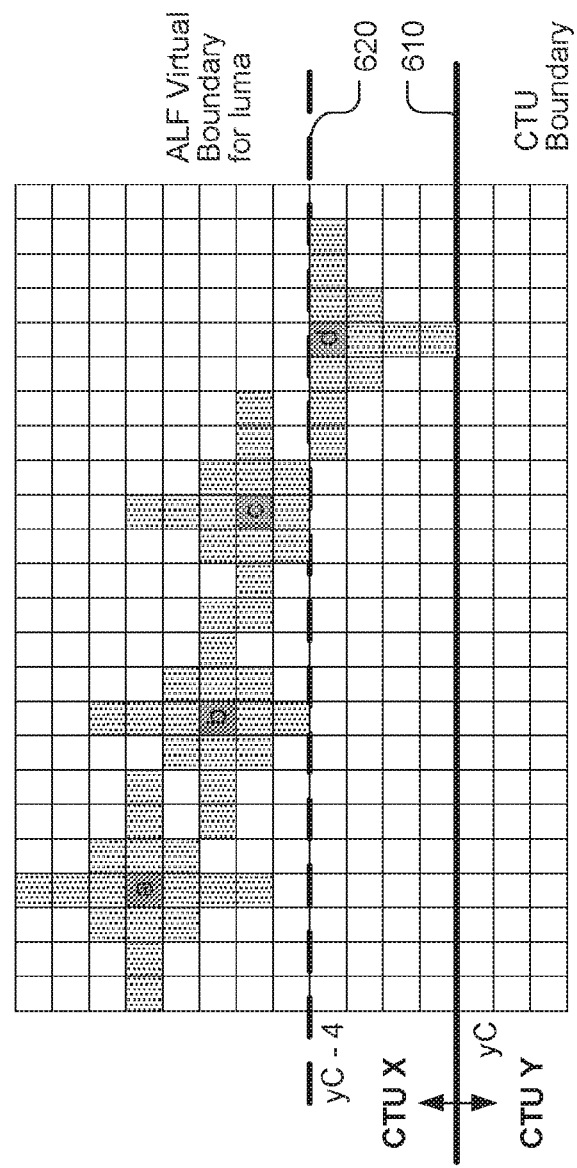
FIG. 6 illustrates an example of ALF virtual boundary for the luma component according to AVS2.
Figure 7:
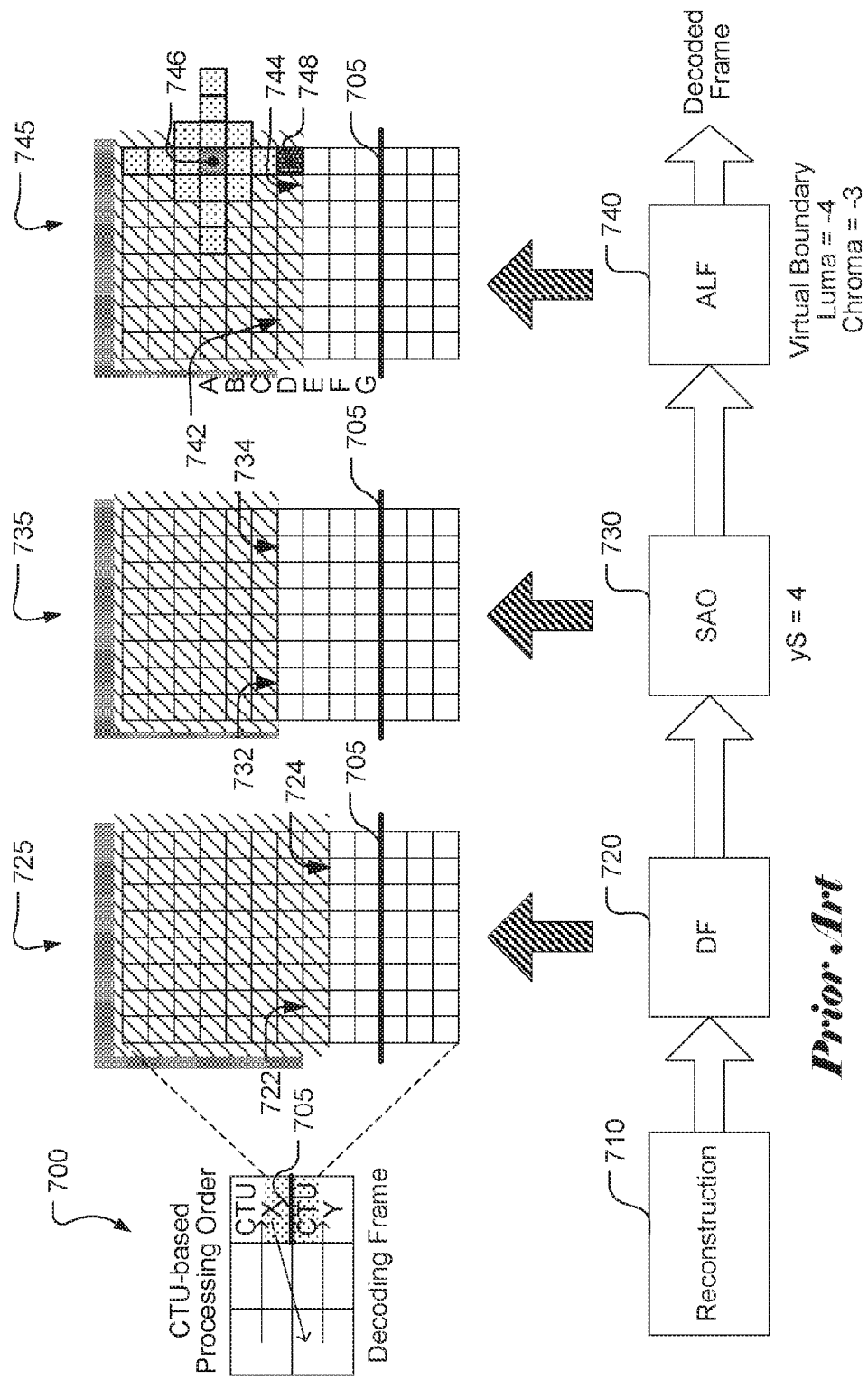
FIG. 7 illustrates an example of data dependency associated with the DF, SAO and ALF processes for an AVS2 decoder.
Figure 8:
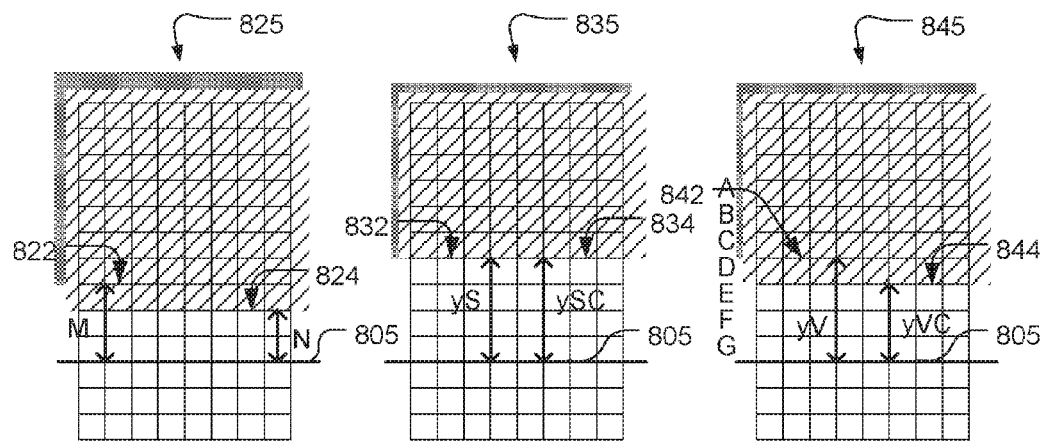
FIG. 8 illustrates an example of the processing status for DF, SAO and ALF processes with loop filter related boundary parameters labeled.

For the convenience to discuss the data dependence between different loop processing stages, loop filter related boundary parameters are introduced in this disclosure. The processing status for DF, SAO and ALF processes in FIG. 7 are repeated in FIG. 8 with loop filter related boundary parameters labeled. The processing status for corresponding DF, SAO and ALF processes are indicated by respective reference numbers 825, 835 and 845. Diagram 825 illustrates the DF processing status at the end of DF processing stage for CTU X. Luma pixels above line 822 (i.e., luma DF boundary) and chroma pixels above line 824 (i.e., chroma DF boundary) are DF processed. M indicates the maximum number of luma pixels and N indicates the maximum number of chroma pixels on each side of the block boundary that can be updated by the DF process. In FIG. 8, CTU boundary 805 is also a block boundary. Diagram 835 illustrates the SAO processing status at the end of SAO processing stage for CTU X. Luma pixels above line 832 (i.e., luma SAO parameter boundary) and chroma pixels above line 834 (i.e., chroma SAO parameter boundary) are SAO processed, where line 832 and line 834 are aligned due to the SAO parameter boundary shift proposed in AVS2 standard. In order to avoid SAO parameter switching in the processing stage of each CTU, SAO parameter boundary is shifted by (xS, yS) for the luma component and (xSC, ySC) for the chroma component. In other words, for a CTU with top-left point (xC, yC), the top boundary of SAO parameter is shifted to (yC-yS) for the luma component and shifted to (yC-ySC) for the chroma component as indicated in FIG. 8. Similarly, SAO parameter boundary shift is also applied to the x-direction. Diagram 845 illustrates the ALF processing status at the end of ALF processing stage for CTU X. Luma pixels above line 842 (i.e., luma ALF virtual boundary) are SAO processed. Chroma pixels above line 844 (i.e., chroma ALF virtual boundary) would be ALF processed. Nevertheless, the ALF process for the chroma component cannot be performed for chroma line D during the CTU X processing stage. ALF virtual boundary is (yC-yV) for the luma component and (yC-yVC) for the chroma component, where yV and yVC correspond to the boundary vertical shifts for the luma and chroma components respectively. For the AVS2 draft standard, the number (i.e., M and N) of boundary pixels to be updated are 3 and 2 for the luma and chroma components respectively. The SAO parameter boundary vertical offsets correspond to 4 for both luma and chroma components. On the other hand, the vertical shifts for the ALF virtual boundaries (i.e., yV and yVC) are 4 and 3 for the luma and chroma components respectively.

First Embodiment. In order to simultaneously reduce the size requirement of line buffer and the computational complexity of SAO parameter switching during processing stage of a CTU, the loop filter related boundaries need to be considered globally as follows:

$$xS=yS=yV=M+1, \text{ and} \quad (1)$$

$$xSC=ySC=yVC=N+1. \quad (2)$$

Figure 9:
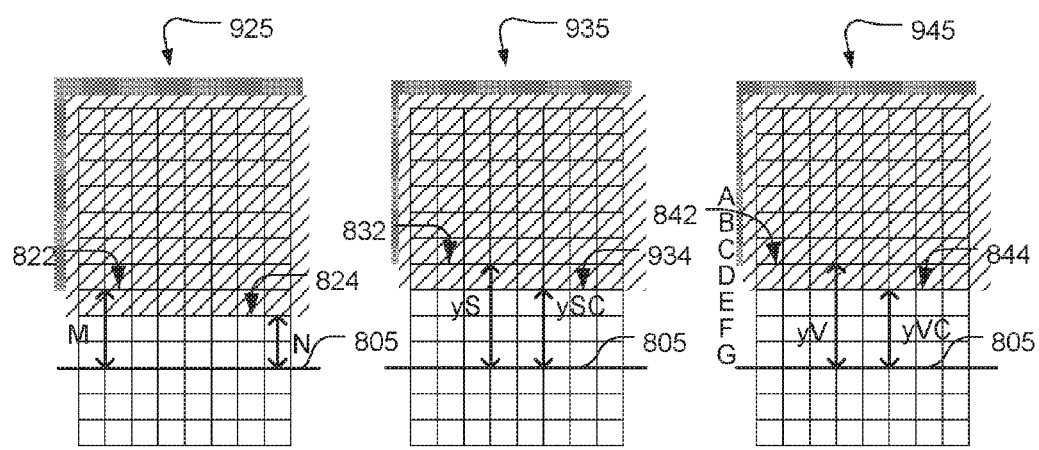
FIG. 9 illustrates an example of the processing status for corresponding DF, SAO and ALF processes at the end of a current CTU processing stage according to the first embodiment of the present invention.

In other words, the boundary vertical shifts for the SAO and ALF processes are aligned to (M+1) for the luma component and correspond to (N+1) for the chroma component. The processing status for corresponding DF, SAO and ALF processes at the end of CTU X processing stage are indicated by respective reference numbers 925, 935 and 945 in FIG. 9. The loop processing boundaries are the same as those in FIG. 8 except for the SAO parameter boundary for the chroma component 934, which is one line below the SAO parameter boundary for the chroma component 834 in FIG. 8. The loop filter related boundaries that are the same as those in FIG. 8 are assigned the same reference numbers. As shown in FIG. 9, the SAO parameter boundary 934 for the chroma component is moved down one line compared to the SAO parameter boundary 834 for the chroma component in FIG. 8. Therefore, the chroma ALF processing for chroma lines A through D can be performed chroma line D is SAO processed according to the arrangement in FIG. 9. Accordingly, the 6 lines to store the SAO processed data due to unavailability of SAO processed data in the line containing chroma line D are not needed anymore. In addition, the SAO parameter switching in a CTU is also reduced.

In the above discussion, an image is partitioned into CTUs and each CTU is partitioned into one or more coding units (CUs). The DF, SAO and ALF processes are applied to block boundaries to reduce artifacts at or near block boundaries. For a coding system that the CTUs are processed in a horizontal scan order, the DF, SAO and ALF processes at CTU boundaries, which are also block boundaries, will require line buffers to store information across CTU row boundaries. However, the image may also be partitioned into other image units, such as macroblock or tile, for coding process. The line buffer issue associated with CTU boundaries also exists in image unit boundaries.

While ALF filter is used as an example in the above illustration, the present invention is applicable to any spatial loop filter. For example, a two-dimensional FIR (finite impulse response) filter with as set of spatial loop filter parameters can be used to replace the ALF. In order to reduce line buffer requirement associated with the spatial loop filter processing, a restricted spatial loop filter boundary can be used to restrict the spatial loop filter processing to use only SAO processed data within the restricted spatial loop filter boundary in an image unit processing stage. For example, the restricted spatial loop filter boundary can be located at y lines above the CTU boundary. The spatial loop filter will be applied to the SAO processed pixels above the restricted spatial loop filter boundary and will only use the SAO processed pixels above the restricted spatial loop filter boundary as input to the spatial loop filter.

Second Embodiment. In a general video codec system, the result of loop filter would be output to external memory as a reference frame or a display frame. In order to favor a regular memory access behavior to further increase memory access efficiency, it will be better to set the loop filter related boundaries as follows:

$$xS=yS=yV=xSC=ySC=yVC=MAX(M,N)+1. \quad (3)$$

Figure 10:
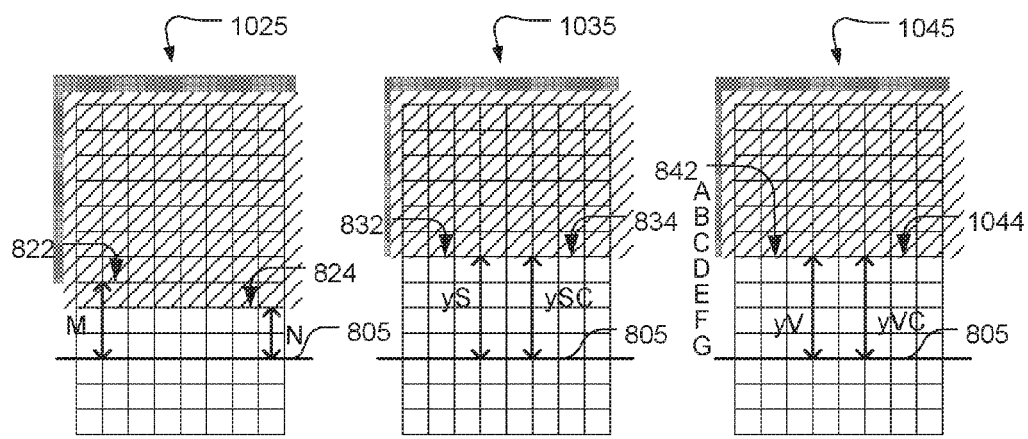
FIG. 10 illustrates an example of the processing status for corresponding DF, SAO and ALF processes at the end of a current CTU processing stage according to the second embodiment of the present invention.

In other words, the boundary vertical shifts for the SAO and ALF processes are all aligned to (MAX(M, N)+1) for both the luma chroma components. The processing status for corresponding DF, SAO and ALF processes are indicated by respective reference numbers 1025, 1035 and 1045. The loop filter related boundaries are the same as those in FIG. 8 except for the ALF virtual boundary for the chroma component 1044, which is one line above the chroma ALF virtual boundary 844 for the chroma component in FIG. 8. The loop filter related boundaries that are the same as those in FIG. 8 are assigned the same reference numbers. As shown in FIG. 10, the SAO parameter boundary and ALF virtual boundary for the luma and chroma components are all aligned. Accordingly, the 6 lines to store the SAO processed data due to unavailability of SAO processed data associated with chroma line D does not exist anymore, and the SAO parameter switching in a CTU is also reduced. In addition, the aligned luma and chroma boundaries can lead to a regular memory access footprint to increase the memory access efficiency.

Third Embodiment. For the case of an advanced SAO process taking more than one line as neighbors for each side of a processing pixel, the loop filter related boundaries are set as follows:

$$xS=yS=yV=M+m, \text{ where } m>1, \text{ and} \quad (4)$$

$$xSC=ySC=yVC=N+n, \text{ where } n>1. \quad (5)$$

Figure 11:
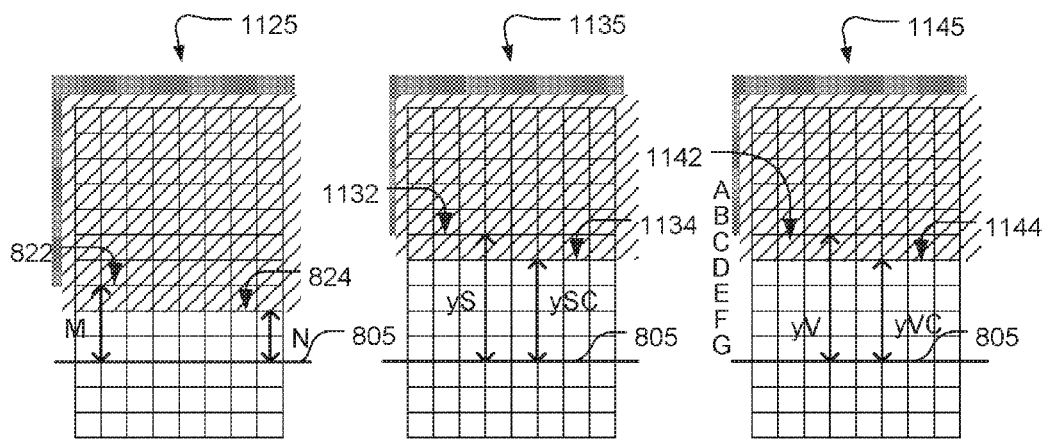
FIG. 11 illustrates an example of the processing status for corresponding DF, SAO and ALF processes at the end of a current CTU processing stage according to the third embodiment of the present invention.

The third embodiment corresponds to an extended first embodiment. Instead of xS=yS=yV=M+1, the loop processing boundary shifts are extended to xS=yS=yV=M+m for the luma component, where m>1. Also, instead of xSC=ySC=yVC=N+1, the loop processing boundary shifts are extended to xSC=ySC=yVC=N+n for the chroma component, where n>1. The first embodiment corresponds to m=1 and n=1 for an SAO process taking only one pixel as neighbor for each side of a processing pixel. The example shown in FIG. 11 corresponds to m=2 and n=2. The processing status for corresponding DF, SAO and ALF processes are indicated by respective reference numbers 1125, 1135 and 1145. The SAO parameter boundary 1132 is aligned with the ALF virtual boundary 1142 the luma component. Also SAO parameter boundary 1134 is aligned with the ALF virtual boundary 1144 the chroma component. Accordingly, the 6 lines to store the SAO processed data due to unavailability of SAO processed data does not exist anymore. In addition, the SAO parameter switching in a CTU is also reduced.

Fourth Embodiment. In order to further increase memory access efficiency for the third embodiment, the loop filter related boundaries are set as follows:

$$xS=yS=yV=xSC=ySC=yVC=MAX(M,N)+m, \text{ where } m>1. \quad (6)$$

Figure 12:
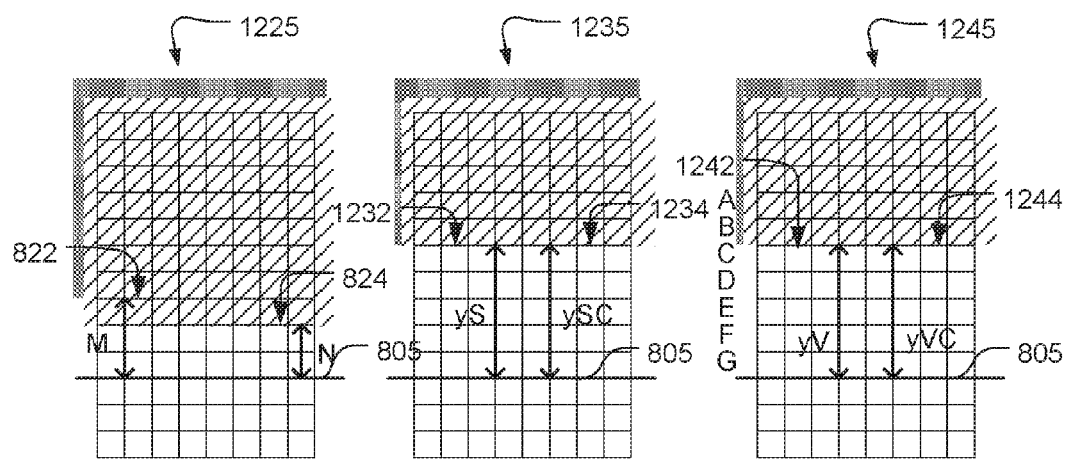
FIG. 12 illustrates an example of the processing status for corresponding DF, SAO and ALF processes at the end of a current CTU processing stage according to the fourth embodiment of the present invention.

The fourth embodiment corresponds to an extended second embodiment. Instead of xS=yS=yV=xSC=ySC=yVC=MAX(M, N)+1, the loop filter related boundary shifts are extended to xS=yS=yV=xSC=ySC=yVC=MAX(M, N)+m for the luma and chroma components, where m>1. The second embodiment corresponds to m=1. The example shown in FIG. 12 corresponds to m=2. The processing status for corresponding DF, SAO and ALF processes are indicated by respective reference numbers 1225, 1235 and 1245. The SAO parameter boundaries 1232 and 1234 and the ALF virtual boundaries 1242 and 1244 for the luma and chroma components are all aligned. Accordingly, the 6 lines to store the SAO processed data due to unavailability of SAO processed data does not exist anymore, and the SAO parameter switching in a CTU is also reduced. In addition, external memory access efficiency can be further improved.

Table 2 compares the line buffer requirements among the conventional AVS2 standard and the embodiments of the present invention. As mentioned before, all above implementations require 3 lines for each of the luma and chroma components to store data immediately above the CTU boundary for deblocking filter. For SAO processing, all systems require to store two luma and two chroma lines of DF results for the SAO process on the first line in the processing stage of the next CTU row. According to the conventional AVS2 approach, 6 lines of SAO processed results would be stored for ALF processing of the chroma component. Systems incorporating any embodiment of the present invention can remove the need for these 6 lines of line buffer for ALF processing on the chroma component. The total numbers of lines required for DF, SAO and ALF are 16, 9 and 10 for the conventional AVS2, the first embodiment and the second embodiment respectively. In other words, the first and second embodiments can reduce the line buffer requirement by 7 and 6 lines.

TABLE 2

|  | Conventional: ALF Chroma virtual boundary = yC-3, SAO_SHIFT_PIX_NUM = 4 | 1st Embodiment: SAO_SHIFT_PIX_NUM for chroma = 3 | 2nd Embodiment: ALF Chroma virtual boundary = yC-4 |
| --- | --- | --- | --- |
| Deblocking Filter | Y: 3<br>C: 3 | Y: 3<br>C: 3 | Y: 3<br>C: 3 |
| SAO (DF result) | Y: 2<br>C: 2 | Y: 2<br>C: 1 | Y: 2<br>C: 2 |
| ALF (SAO result) | Y: 0<br>C: 6 | Y: 0<br>C: 0 | Y: 0<br>C: 0 |
| Total lines for line buffer | 16 | 9 | 10 |

TABLE 2-continued

| | Conventional:<br>ALF Chroma virtual<br>boundary = yC-3,<br>SAO_SHIFT_PIX_NUM = 4 | 1st Embodiment:<br>SAO_SHIFT_PIX_NUM<br>for chroma = 3 | 2nd Embodiment:<br>ALF Chroma virtual<br>boundary = yC-4 |
|---|---|---|---|
| DRAM Efficiency | Bad | Normal | Good |
| Hardware Cost | High | Low | Low |

Figure 13:
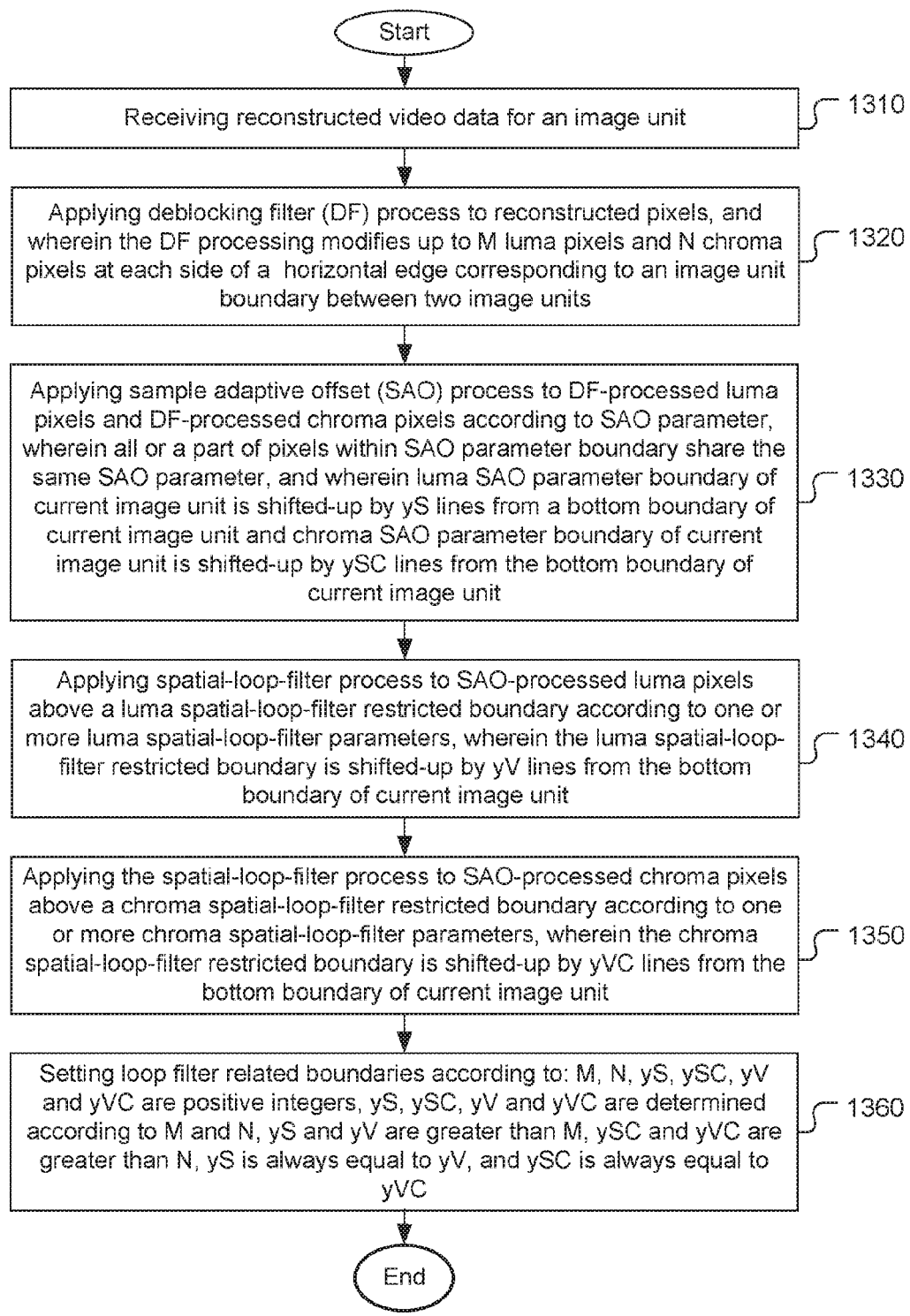
FIG. 13 illustrates an exemplary flowchart for a coding system incorporating an embodiment of the present invention, where the system aligns loop filter related boundaries to reduce line buffer requirement.

FIG. 13 illustrates an exemplary flowchart for a coding system incorporating an embodiment of the present invention, where the system aligns loop filter related boundaries to reduce line buffer requirement. The system receives reconstructed video data for an image unit as shown in step 1310. The reconstructed video data may be retrieved from memory (e.g., computer memory, buffer (RAM or DRAM) or other media) or from a processor. Deblocking filter (DF) process is then applied to reconstructed pixels above a deblocking boundary of the image unit in step 1320. The DF processing modifies up to M luma pixels and N chroma pixels at each side of a horizontal edge corresponding to an image unit boundary between two image units. Sample adaptive offset (SAO) process is applied to DF-processed luma pixels and DF-processed chroma pixels according to SAO parameter as shown in step 1330, where all or a part of pixels within SAO parameter boundary share the same SAO parameter, and where luma SAO parameter boundary of current image unit is shifted-up by yS lines from a bottom boundary of current image unit and chroma SAO parameter boundary of current image unit is shifted-up by ySC lines from the bottom boundary of current image unit. Spatial-loop-filter process is applied to SAO-processed luma pixels above a luma spatial-loop-filter restricted boundary according to one or more luma spatial-loop-filter parameters in step 1340, where the luma spatial-loop-filter restricted boundary is shifted-up by yV lines from the bottom boundary of current image unit. The spatial-loop-filter process is applied to SAO-processed chroma pixels above a chroma spatial-loop-filter restricted boundary according to one or more chroma spatial-loop-filter parameters in step 1350, where the chroma spatial-loop-filter restricted boundary is shifted-up by yVC lines from the bottom boundary of current image unit. In order to reduce the line buffer requirement and/or reduce loop filter processing switching, the loop filter related boundaries are set according to: M, N, yS, ySC, yV and yVC are positive integers, yS, ySC, yV and yVC are determined according to M and N, yS and yV are greater than M, ySC and yVC are greater than N, yS is always equal to yV, and ySC is always equal to yVC as shown in step 1360.

The flowchart shown above is intended to illustrate examples of loop filter processing according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for loop filter processing of reconstructed video data for a video coding system, wherein reconstructed video data is partitioned into image units, the method comprising:
   receiving reconstructed video data for image units; and
   encoding or decoding the reconstructed video data by:
      applying deblocking filter (DF) processing to reconstructed pixels of the video data, wherein the DF processing modifies up to M luma pixels and N chroma pixels at each side of a horizontal edge corresponding to an image unit boundary between two of the image units to provide DF-processed luma pixels and DF-processed chroma pixels;

providing a luma SAO parameter boundary of the current image unit, wherein the luma SAO parameter boundary of the current image unit is shifted-up by yS lines from a bottom boundary of the current image unit;

providing a chroma SAO parameter boundary of the current image unit, wherein the chroma SAO parameter boundary of the current image unit is shifted-up by ySC lines from the bottom boundary of the current image unit;

applying sample adaptive offset (SAO) processing to one or more of the DF-processed luma pixels above the luma SAO parameter boundary of the current image unit according to one or more SAO parameters to provide SAO-processed luma pixels;

applying the SAO processing to one or more of the DF-processed chroma pixels above the chroma SAO parameter boundary of the current image unit according to the one or more SAO parameters to provide SAO-processed chroma pixels;

providing a luma spatial-loop-filter restricted boundary, wherein the luma spatial-loop-filter restricted boundary is shifted-up by yV lines from the bottom boundary of the current image unit;

providing a chroma spatial-loop-filter restricted boundary, wherein the chroma spatial-loop-filter restricted boundary is shifted-up by yVC lines from the bottom boundary of the current image unit;

applying spatial-loop-filter processing to one or more of the SAO-processed luma pixels above the luma spatial-loop-filter restricted boundary according to one or more luma spatial-loop-filter parameters; and applying the spatial-loop-filter processing to one or more of the SAO-processed chroma pixels above the chroma spatial-loop-filter restricted boundary according to one or more chroma spatial-loop-filter parameters wherein:
M, N, yS, ySC, yV and yVC are positive integers;
yS, ySC, yV and yVC are determined according to M and N;
each of yS and yV is greater than M;
each of ySC and yVC is greater than N;
yS is always equal to yV; and
ySC is always equal to yVC.

2. The method of claim 1, wherein each image unit corresponds to a coding tree unit (CTU).

3. The method of claim 1, wherein the spatial-loop-filter process corresponds to adaptive loop filter (ALF) process.

4. The method of claim 1, wherein yS and yV are equal to (M+1) and ySC and yVC are equal to (N+1).

5. The method of claim 1, wherein yS, yV, ySC and yVC are equal to (Max (M,N)+1).

6. The method of claim 1, wherein yS and yV are equal to (M+m) and ySC and yVC are equal to (N+n), and wherein m and n are integers greater than 1.

7. The method of claim 1, wherein yS, yV, ySC and yVC are equal to (Max (M,N)+m), and wherein m is an integer greater than 1.

8. The method of claim 1, wherein M is equal to 3 and N is equal to 2.

9. The method of claim 8, wherein yS and yV are equal to 4 and ySC and yVC are equal to 3.

10. The method of claim 8, wherein yS, yV, ySC and yVC are equal to 4.

11. The method of claim 8, wherein yS and yV are equal to (3+m) and ySC and yVC are equal to (2+n) and wherein m and n are integers greater than 1.

12. The method of claim 8, wherein yS, yV, ySC and yVC are equal to (3+m), and wherein m is an integer greater than 1.

13. An apparatus for loop filter processing of reconstructed video data for a video coding system, wherein reconstructed video data is partitioned into image units, the apparatus comprising:

one or more electronic circuits, wherein said one or more electronic circuits are coupled to a line buffer and said one or more electronic circuits are arranged to:

receive reconstructed video data for image units; and encode or decode the reconstructed video data by:

applying deblocking filter (DF) processing to reconstructed pixels of the video data, wherein the DF processing modifies up to M luma pixels and N chroma pixels at each side of a horizontal edge corresponding to an image unit boundary between two of the image units to provide DF-processed luma pixels and DF-processed chroma pixels;

providing a luma SAO parameter boundary of the current image unit, wherein the luma SAO parameter boundary of the current image unit is shifted-up by yS lines from a bottom boundary of the current image unit;

providing a chroma SAO parameter boundary of the current image unit, wherein the chroma SAO parameter boundary of the current image unit is shifted-up by ySC lines from the bottom boundary of the current image unit;

applying sample adaptive offset (SAO) processing to one or more of the DF-processed luma pixels above the luma SAO parameter boundary of the current image unit according to one or more SAO parameters to provide SAO-processed luma pixels;

applying the SAO processing to one or more of the DF-processed chroma pixels above the chroma SAO parameter boundary of the current image unit according to the one or more SAO parameters to provide SAO-processed chroma pixels;

providing a luma spatial-loop-filter restricted boundary, wherein the luma spatial-loop-filter restricted boundary is shifted-up by yV lines from the bottom boundary of the current image unit;

providing a chroma spatial-loop-filter restricted boundary, wherein the chroma spatial-loop-filter restricted boundary is shifted-up by yVC lines from the bottom boundary of the current image unit;

applying spatial-loop-filter processing to one or more of the SAO-processed luma pixels above the luma spatial-loop-filter restricted boundary according to one or more luma spatial-loop-filter parameters; and applying the spatial-loop-filter processing to one or more of the SAO-processed chroma pixels above the chroma spatial-loop-filter restricted boundary according to one or more chroma spatial-loop-filter parameters wherein:
M, N, yS, ySC, yV and yVC are positive integers;
yS, ySC, yV and yVC are determined according to M and N;
each of yS and yV is greater than M;
each of ySC and yVC is greater than N;

yS is always equal to yV; and ySC is always equal to yVC.

14. The apparatus of claim 13, wherein each image unit corresponds to a coding tree unit (CTU).

15. The apparatus of claim 13, wherein the spatial-loop-filter process corresponds to adaptive loop filter (ALF) process.

16. The apparatus of claim 13, wherein yS and yV are equal to (M+1) and ySC and yVC are equal to (N+1).

17. The apparatus of claim 13, wherein yS, yV, ySC and yVC are equal to (Max (M,N)+1).

18. The apparatus of claim 13, wherein yS and yV are equal to (M+m) and ySC and yVC are equal to (N+n), and wherein m and n are integers greater than 1.

19. The apparatus of claim 13, wherein yS, yV, ySC and yVC are equal to (Max (M,N)+m), and wherein m is an integer greater than 1.

20. The apparatus of claim 13, wherein M is equal to 3 and N is equal to 2.

21. The apparatus of claim 20, wherein yS and yV are equal to 4 and ySC and yVC are equal to 3.

22. The apparatus of claim 20, wherein yS, yV, ySC and yVC are equal to 4.

23. The apparatus of claim 20, wherein yS and yV are equal to (3+m) and ySC and yVC are equal to (2+n) and wherein m and n are integers greater than 1.

24. The apparatus of claim 20, wherein yS, yV, ySC and yVC are equal to (3+m), and wherein m is an integer greater than 1.

25. The method of claim 1, wherein the applying the SAO processing to one or more of the DF-processed chroma pixels above the chroma SAO parameter boundary of the current image unit is performed without storing lines of SAO processed data associated with a first chroma line of the current image unit above the chroma SAO parameter boundary.

* * * * *